United States Patent
Kwon (10) Patent No.: US 9,516,211 B2
(45) Date of Patent: Dec. 6, 2016

(54) PHOTOGRAPHING APPARATUS AND METHOD OF PHOTOGRAPHING IMAGE THEREOF

(71) Applicant: SAMSUNG Electronics Co., Ltd., Suwon-si, Gyeonggi-do (KR)

(72) Inventor: O-hyun Kwon, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 155 days.

(21) Appl. No.: 14/017,385

(22) Filed: Sep. 4, 2013

(65) Prior Publication Data

US 2014/0063327 A1 Mar. 6, 2014

(30) Foreign Application Priority Data

Sep. 5, 2012 (KR) .............................. 10-2012-98317

(51) Int. Cl.
*H04N 5/232* (2006.01)

(52) U.S. Cl.
CPC .................................. *H04N 5/23212* (2013.01)

(58) Field of Classification Search
CPC .................. G06T 2207/20021; G06T 7/0069; G06T 2207/10028; G06T 2207/10148; H04N 5/23212; H04N 13/0022; H04N 21/44218; H04N 2013/0081; H04N 5/23229; H04N 5/23293; H04N 2213/003; H04N 5/2621
USPC ................... 348/135, 346, 347, 231.99, 340; 382/154, 167
See application file for complete search history.

(56) References Cited

U.S. PATENT DOCUMENTS

| | | | |
|---|---|---|---|
| 7,430,004 B2* | 9/2008 | Cazier | 348/231.4 |
| 2005/0024515 A1 | 2/2005 | Ikehata et al. | |
| 2005/0099511 A1 | 5/2005 | Cazier | |
| 2009/0167930 A1* | 7/2009 | Safaee-Rad et al. | 348/347 |
| 2010/0080448 A1* | 4/2010 | Tam et al. | 382/154 |
| 2011/0317023 A1 | 12/2011 | Tsuda et al. | |
| 2013/0129245 A1* | 5/2013 | Tin | 382/248 |
| 2013/0242086 A1* | 9/2013 | Brueckner et al. | 348/135 |

FOREIGN PATENT DOCUMENTS

WO 2008/016882 2/2008

OTHER PUBLICATIONS

Extended European Search Report dated Sep. 6, 2016 in European Patent Application No. 13183008.5.

* cited by examiner

*Primary Examiner* — Twyler Haskins
*Assistant Examiner* — Padma Haliyur
(74) *Attorney, Agent, or Firm* — Staas & Halsey LLP (57) ABSTRACT

A photographing apparatus and a method thereof includes acquiring a depth map of an image currently captured by the photographing apparatus, if auto focusing (AF) of the photographing apparatus is performed, calculating depth information of an area in which the AF has been performed, and outputting a guide audio having a volume adjusted according to the calculated depth information to inform a user of a state of auto focusing with respect to a desired area without checking a viewfinder.

18 Claims, 9 Drawing Sheets

| DEPTH SECTION | VOLUME STAGE |
|---|---|
| 1 | 1 |
| 2 | |
| 3 | |
| 4 | 2 |
| 5 | |
| 6 | |
| 7 | 3 |
| 8 | |
| 9 | |
| 10 | 4 |
| 11 | |
| 12 | |
| 13 | 5 |
| 14 | |
| 15 | |

FIG. 9

PHOTOGRAPHING APPARATUS AND METHOD OF PHOTOGRAPHING IMAGE THEREOF

CROSS-REFERENCE TO RELATED APPLICATIONS

This application claims priority under 35 U.S.C. §119 from Korean Patent Application No. 10-2012-98317, filed on Sep. 5, 2012, in the Korean Intellectual Property Office, the disclosure of which is incorporated herein by reference in its entirety.

BACKGROUND OF THE INVENTION

1. Field of the Invention

The present general inventive concept generally relates to a photographing apparatus and a method of photographing an image thereof, and more particularly, to a photographing apparatus to adjust a volume of a guide audio by using depth information of a captured image, and a method of photographing an image thereof.

2. Description of the Related Art

A user may capture an image without checking an electronic viewfinder (e.g., a liquid crystal display (LCD) image or the like) and an optical viewfinder which are installed in a photographing apparatus. For example, the user captures the image without checking a display when performing timer capturing and self-capturing.

In particular, if the user performs the self-capturing, the user captures the image without checking a display. Therefore, the user is not able to check an area in which an auto focus has been performed. As a result, the user captures an image having an undesired area in which an auto focus has been performed.

If the user performs the timer capturing, the user captures the image without checking the display. Therefore, the user is not able to check a position where the user is. Also, if the user is far away from the photographing apparatus, the user is not able to be aware of a state of photographing.

In other words, if the user captures an image without checking a viewfinder as described above, the user is not able to appropriately check an area that the user wants to capture.

SUMMARY OF THE INVENTION

The exemplary embodiments provide a photographing apparatus to provide a guide audio whose volume has been adjusted by using depth information, to perform an auto focus in a desired area even if the user captures an image without checking a viewfinder, and a method for photographing an image thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a photographing method of a photographing apparatus. The photographing method may include acquiring a depth map of an image currently captured by the photographing apparatus, if auto focusing (AF) of the photographing apparatus is performed, calculating depth information of an area in which the AF has been performed, and outputting a guide audio having a volume adjusted according to the calculated depth information.

The photographing method may further include matching the acquired depth map with block data of the captured image divided into a plurality of areas to generate depth block data.

The calculation of the depth information may include performing AF with respect to at least one of the plurality of areas constituting the depth block data, and calculating a representative depth value of the area in which the AF has been performed.

The output of the guide audio may include determining a depth section of a plurality of depth sections including the representative depth value, determining a volume matching with the depth section, and outputting the guide audio having the determined volume.

The output of the guide audio may include calculating representative depth values of the plurality of areas of the depth block data to determine maximum and minimum representative depth values of the captured image, setting the plurality of depth sections by using the maximum and minimum representative depth values, determining the depth section of the plurality of depth sections including the representative depth value of the area in which the AF has been performed; determining the volume matching with the depth section, and outputting the guide audio having the determined volume.

Different volumes may match with the preset number of depth section of the plurality of depth sections.

The photographing method may further include if the area in which the AF has been performed is changed, outputting the guide audio having the volume adjusted according to depth information of the changed area.

If the photographing apparatus enters a timer photographing mode, the guide audio may be output according to the calculated depth information.

The depth map may be acquired through a plurality of lens of the photographing apparatus or a depth sensor of the photographing apparatus.

The foregoing and/or other features and utilities of the present general inventive concept may be achieved by providing a photographing apparatus including a photographing part, a depth map acquirer which acquires a depth map of an image currently captured by the photographing part, a controller which, if AF of the photographing apparatus is performed, calculates depth information of an area in which the AF has been performed and determines a volume of a guide audio according to the calculated depth information; and an output part which outputs the guide audio having the determined volume.

The controller may match the acquired depth map with block data of the captured image divided into a plurality of areas to generate depth block data.

If AF is performed with respect to at least one of the plurality of areas constituting the depth block data, the controller may calculate a representative depth value of the area in which the AF has been performed.

The controller may determine a depth section of a plurality of depth sections including the representative depth value to determine a volume matching with the depth section.

The controller may calculate representative depth values of the plurality of areas of the depth block data to determine maximum and minimum representative depth values of the captured image, set the plurality of depth sections by using the maximum and minimum representative depth values, determine the depth section of the plurality of depth sections comprising the representative depth value of the area in which the AF has been performed, and determine the volume matching with the depth section.

Different volumes may match with the preset number of depth section of the plurality of depth sections.

If the area in which the AF has been performed is changed, the controller may calculate depth information of the changed area to determine the volume.

If the photographing apparatus enters a timer photographing mode, the controller may output the guide audio according to the calculated depth information.

The depth map acquirer may acquire the depth map through a plurality of lens of the photographing apparatus or a depth sensor of the photographing apparatus.

The foregoing and/or other features and utilities of the present general inventive concept may also be achieved by providing a computer-readable medium to contain computer-readable codes as a program to execute a method described above or hereinafter.

The foregoing and/or other features and utilities of the present general inventive concept may also be achieved by providing a photographing apparatus including a photographing part, a depth map acquirer to acquire a depth map of an image currently captured by the photographing part, and a controller to obtain depth information of an area of the image in an auto photographing operation, and to generate a signal to correspond to a volume of a guide audio according to the depth information.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
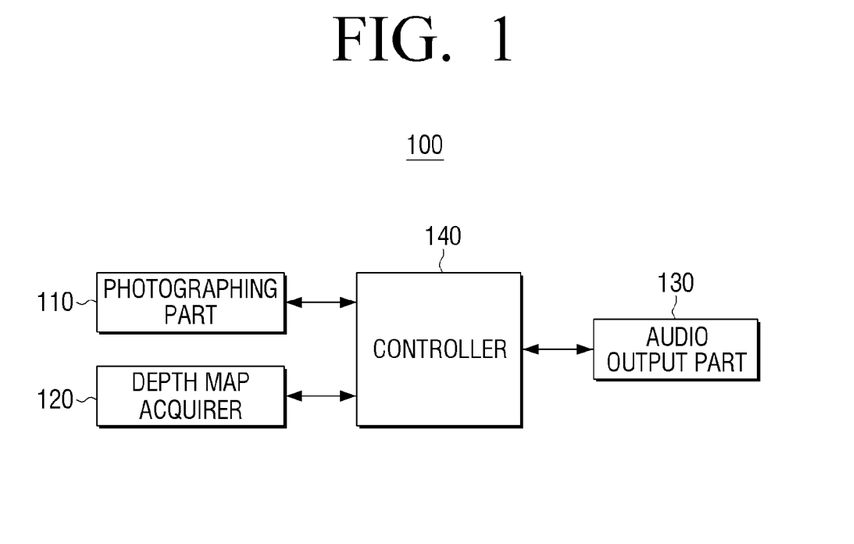
FIG. 1 is a schematic block diagram illustrating a photographing apparatus according to an exemplary embodiment of the present general inventive concept.

FIG. 1 is a schematic block diagram illustrating a photographing apparatus 100 according to an exemplary embodiment of the present general inventive concept. Referring to FIG. 1, the photographing apparatus 100 includes a photographing part 110, a depth map acquirer 120, an audio output part 130, and a controller 140.

The photographing apparatus 100 according to the present exemplary embodiment may be realized as a digital camera, for example. However, the present general inventive concept is not limited thereto. The photographing apparatus 100 may be realized as various types such as a portable phone, a smart phone, a tablet PC, etc.

The photographing part 110 senses an optical signal incident onto a lens part 111 to acquire an image that a user wants to capture.

The depth map acquirer 120 acquires a depth map of the captured image. Here, if the photographing apparatus 100 is a stereo camera having a plurality of photographing parts 110, the depth map acquirer 120 may acquire depth maps from a plurality of images captured through the plurality of photographing parts 110. The depth map acquirer 120 may also acquire the depth map by using a depth sensor.

The audio output part 130 outputs an audio under control of the controller 140. In particular, the audio output unit 130 may output an indication, for example, a guide audio (e.g., a beep sound) according to a volume determined by the controller 140. The audio output part 130 may output a signal to an external device through a wired or wireless communication method such that the external device can output an indication to a user according to the signal. The external device may have a function of the input part 160 of FIG. 1 to input a user command and data to the photographing apparatus.

The controller 140 controls an overall operation of the photographing apparatus 100. When an auto focus operation is performed with respect to the captured image, the controller 140 controls the audio output part 130. The controller 140 calculates depth information of an area in which the auto focus operation has been performed, determine a volume of the guide audio according to the calculated depth information, and output the guide audio having the determined volume.

In detail, if the capturing of the image is performed, the controller 140 may match (compare) the depth map acquired through the depth map acquirer 120 with block data divided into a plurality of areas to generate depth block data. If the auto focus operation is performed, the controller 140 may determine at least one of a plurality of areas constituting the depth block data as an area in which the auto focus operation has been or is performed. The controller 140 may also calculate a representative depth value (e.g., an average value, a mode, or the like) of the area in which the auto focus operation has been performed. The controller 140 may determine a depth section of a plurality of depth sections including the calculated representative depth value and may determine a volume matching with (corresponding to) the depth section. Here, the depth section may be determined by maximum and minimum values of representative depth values of the plurality of areas constituting the depth block data. The controller 140 may control the audio output part 130 to output the guide audio according to the determined volume.

Through the photographing apparatus 100 as described above, the user may check a relative distance of the area in which the auto focus operation has been performed, according to the volume of the guide audio without checking a viewfinder. Therefore, even if the user performs self-photographing or timer photographing, the user may capture an image having a desired area in which an auto focus operation has been performed.

Figure 2:
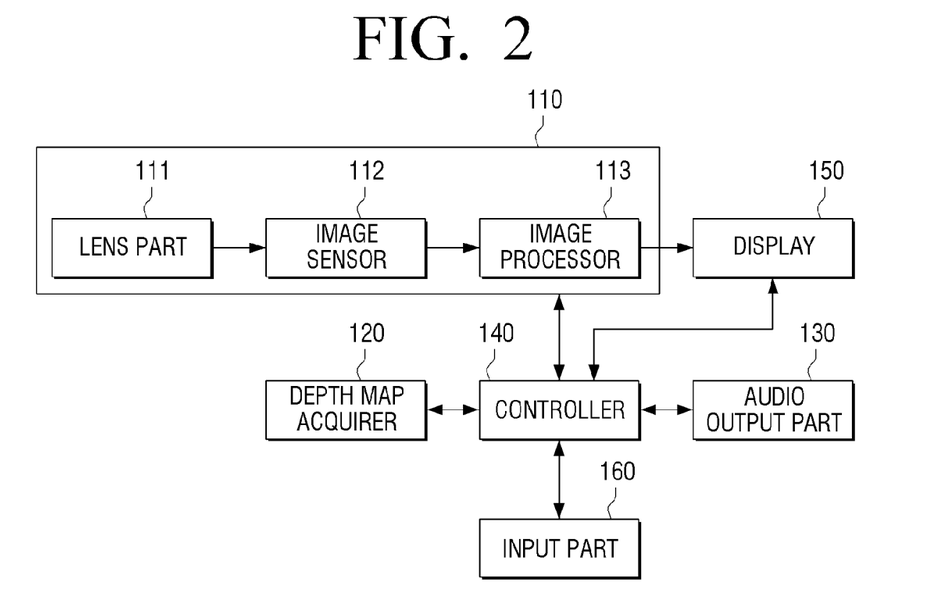
FIG. 2 is a block diagram illustrating a photographing apparatus according to an exemplary embodiment of the present general inventive concept.

FIG. 2 is a block diagram illustrating a photographing apparatus according to an exemplary embodiment of the present general inventive concept. The photographing apparatus of FIG. 2 may be the same as the photographing apparatus 100 of FIG. 1. Referring to FIG. 2, the photographing apparatus 100 includes the photographing part 110, the depth map acquirer 120, the audio output part 130, the controller 140, a display 150, and an input part 160.

The photographing part 110 captures an image that a user wants to capture. In particular, the photographing part 110 includes the lens part 111, an image sensor 113, and an image processor 115.

The lens part 111 includes a zoom lens which zooms in or out a size of a subject, a focus lens which adjusts a focus of the subject, and an aperture which adjusts an amount of light. The lens part 111 receives a light signal from the subject.

The image sensor 112 converts the light signal of the subject incident through the lens part 111 into an electrical signal, performs signal-processing, and transmits the signal-processed data to the image processor 113. In particular, the image sensor 112 may be a complementary metal oxide semiconductor (CMOS) image sensor, but this is only an exemplary embodiment. Therefore, the image sensor 112 may be realized as a charge-coupled device (CCD) image sensor.

The image sensor 112 may include a color filter to acquire a color image and may mainly use a filer, for example, a color filter array (CFA). The CFA transmits only light indicating one color every one pixel, has a regular array structure, and has several types according to an array structure. The image sensor 112 also includes an analog-to-digital converter (ADC) which converts an analog image signal into a digital data signal.

Under control of the controller 140, the image processor 113 processes data output from the image sensor 112 to display a live view on the display 150 or store the captured image on a storage (not illustrated). Here, the image processor 113 may perform a processing job (e.g. auto focusing (AF), auto white balancing (AWB), or an auto exposure (AE)) with respect to the captured image data.

The depth map acquirer 120 acquires a depth map of the captured image. Here, the depth map refers to an image including distance information of the captured image and may be expressed with different gray levels (e.g., gradations between 0 and 255) according to a distance with respect to a reference, for example, a location of the photographing apparatus 100 or the photographing part 110. For example, a subject close to the photographing apparatus 100 may be brightly expressed or a high gradation, and a subject far away from the photographing apparatus 100 may be darkly expressed or a low gradation.

When the photographing apparatus 100 is a stereo camera, the depth map acquirer 120 may acquire the depth map by using images acquired from a plurality of photographing parts 110. If the photographing apparatus 100 includes a depth sensor (not illustrated), the depth map acquirer 120 may acquire the depth map by using the depth sensor.

The audio output part 130 outputs various types of audio data under control of the controller 140. The audio output part 130 may output a guide audio (e.g. a beep sound, etc.) having a volume determined by the controller 140.

The display 150 displays a live view by using the image data signal-processed by the image processor 115. Here, the display 150 may be realized as a liquid crystal display (LCD). However, the present general inventive concept is not limited thereto. The display 150 may be realized as a display device.

The input part 160 receives a command of a user to control the photographing apparatus 100. In particular, the input part 160 may include a shutter which is to receive a photographing command of the user, a touch screen, a button, and a dial which are to change a mode and a setup of the photographing apparatus 100, etc.

The controller 140 controls an overall operation of the photographing apparatus 100 based on the user command input into the input part 160. When an AF operation is performed in the photographing apparatus 100, the controller 140 calculates depth information of an area in which the AF has been performed, the volume of the guide audio according to the calculated depth information, and controls the audio output part 120 to output the guide audio having the determined volume. The controller 140 may calculate the depth information of the area in an auto focusing (AF) operation and then generate a signal to inform a user of an indication corresponding to the calculated depth information. The indication may be a display image or sound output from an indication unit formed on the photographing apparatus or output from a remote unit which receives the signal from the photographing apparatus through a wired or wireless communication. The remote unit may further have a function of the input part 160 of FIG. 1 to input a user command or data to the photographing apparatus.

When photographing is performed by the photographing part 110, the controller 140 acquires an image captured by the photographing part 110. For example, the controller 140 acquires an image 300 captured by the photographing part 110 as shown in FIG. 1.

Figure 4:
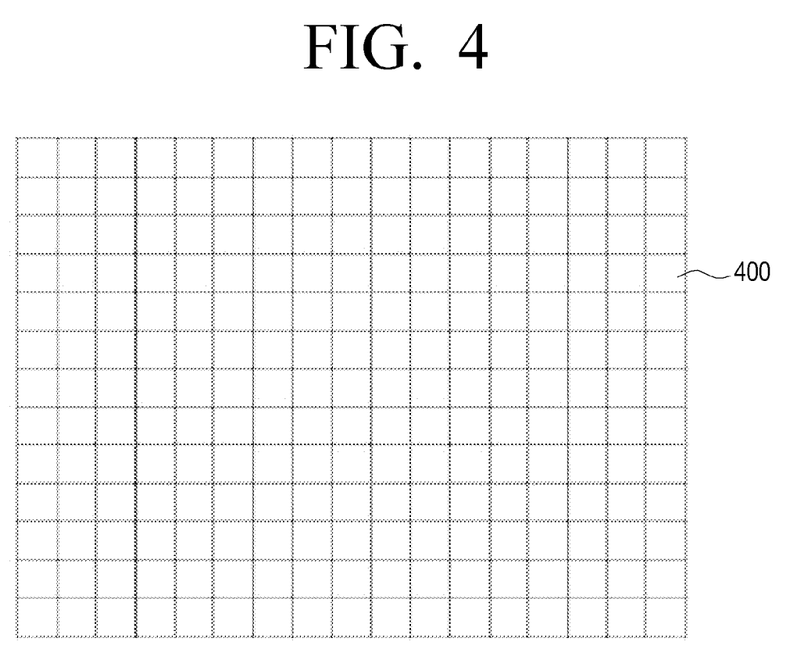
FIG. 4 is a view illustrating block data according to an exemplary embodiment of the present general inventive concept.
Figure 5:
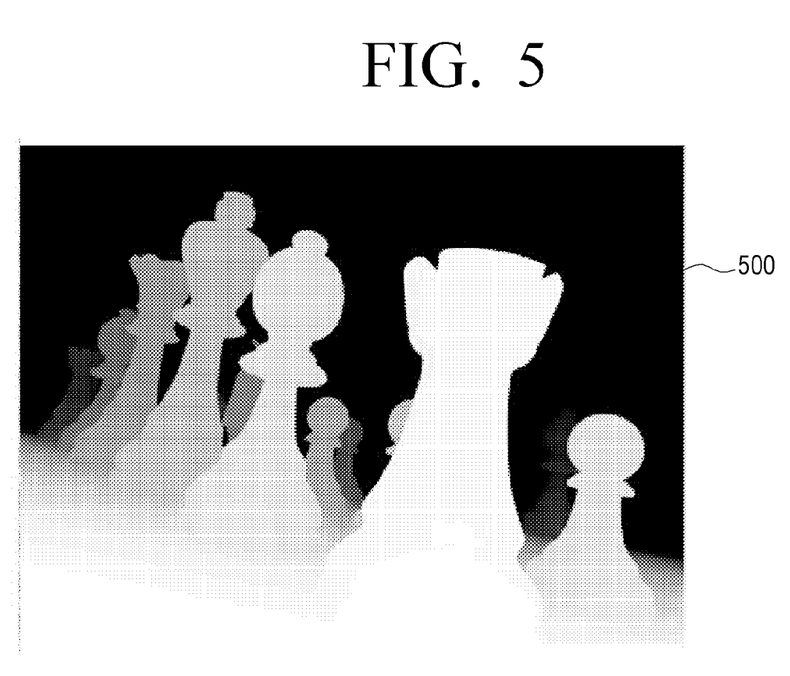
FIG. 5 is a view illustrating a depth map of an image which is being currently captured by a user according to an exemplary embodiment of the present general inventive concept.
Figure 6:
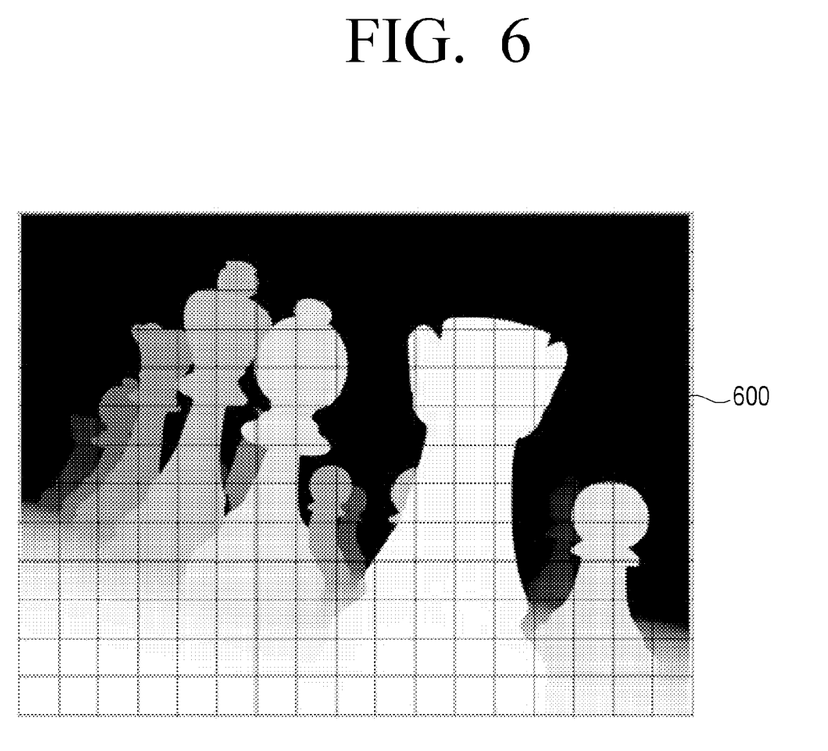
FIG. 6 is a view illustrating depth block data of an image which is being currently captured by a user according to an exemplary embodiment of the present general inventive concept.

If the depth map acquirer 120 acquires a depth map of the captured image, the controller 140 matches the acquired depth map with block data of the captured image divided into a plurality of areas to generate depth block data. In detail, the controller 140 may match block data 400 of a captured image divided into a plurality of areas as illustrated in FIG. 4 with a depth map 500 acquired by the depth map acquirer 120 as illustrated in FIG. 5 to generate depth block data 600 as illustrated in FIG. 6.

Figure 7:
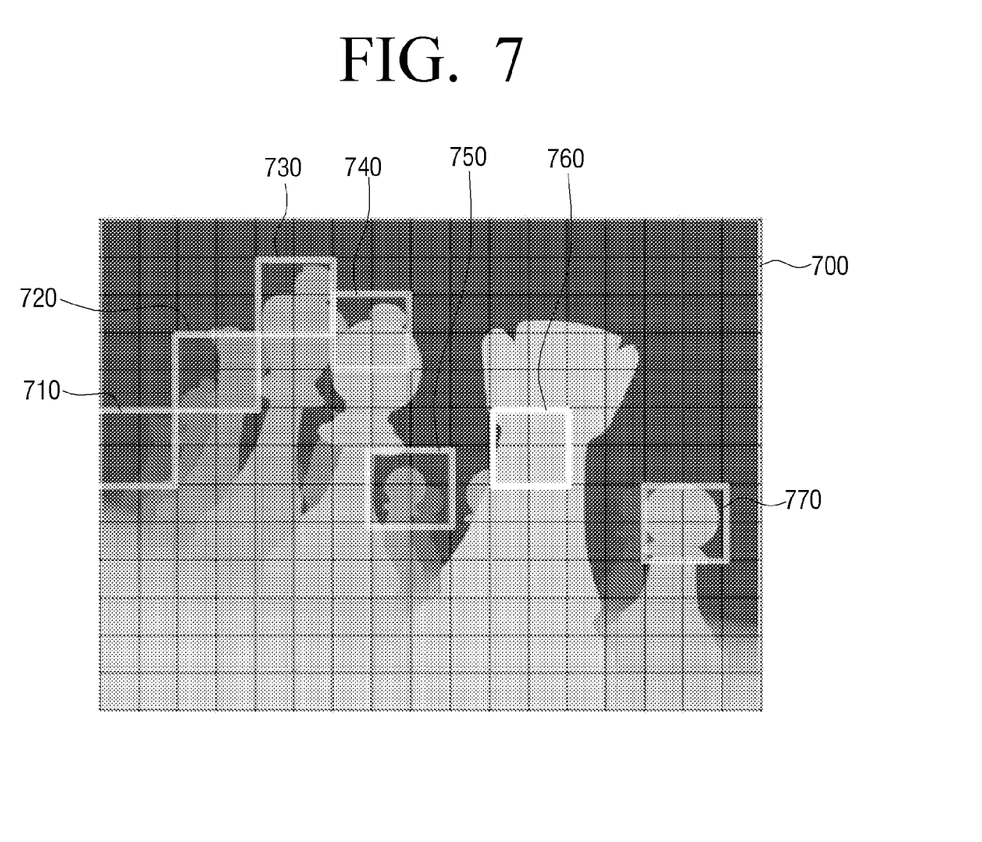
FIG. 7 is a view illustrating an area of depth block data in which an auto focusing (AF) has been performed according to an exemplary embodiment of the present general inventive concept.

If AF is performed with respect to at least one of the plurality of areas constituting the depth block data, the controller 140 may calculate a representative depth value of the area in which the AF has been performed. For example, if AF is performed with respect to a sixth subject area 760 of a plurality of subject areas 710 through 770 of depth block data 700 as shown in FIG. 7, the controller 140 may calculate a representative depth value of the sixth subject area 760. Here, the representative depth value may be one of an average value of a depth value of the subject area 760, a most probable value of the depth value, and a median value of the depth value.

If the representative depth value is calculated, the controller 140 may determine a depth section of a plurality of depth sections having the calculated representative depth value. Here, the photographing apparatus 100 may store the plurality of depth sections corresponding to the depth value. For example, if there are depth values between 0 and 255, the depth value is from 0 to 16, the depth section belongs to a first depth section. If the depth value is from 17 to 33, the depth section belongs to a second depth section. If the depth value is from 34 to 50, the depth section belongs to a third depth section. If the depth value is from 51 to 67, the depth section belongs to a fourth depth section. If the depth value is from 68 to 84, the depth section belongs to a fifth depth section. If the depth value is from 85 to 101, the depth section is a sixth depth section. If the depth value is from 102 to 118, the depth section belongs to a seventh depth section. If the depth value is from 119 to 135, the depth section belongs to an eighth depth section. If the depth value is from 136 to 152, the depth section belongs to a ninth depth section. If the depth value is from 153 to 169, the depth section belongs to a tenth depth section. If the depth value is from 170 to 186, the depth section belongs to an eleventh depth section. If the depth value is from 187 to 203, the depth section belongs to a twelfth depth section. If the depth value is from 204 to 220, the depth section belongs to a thirteenth depth section. If the depth value is from 221 to 237, the depth section belongs to a fourteenth depth section. If the depth value is from 238 to 255, the depth section belongs to a fifteenth depth section. Therefore, if the representative depth value of the sixth subject area 760 is 52, the controller 140 may determine the sixth subject area 760 as the fourth depth section.

As described above, depth sections may be pre-divided based on a whole depth value, but this is only an exemplary embodiment. Therefore, the depth sections may be divided according to other types of methods. For example, the controller 140 may calculate representative depth values of a plurality of areas of depth block data to determine a maximum representative depth value and a minimum of a captured image and set a plurality of depth sections by using the maximum and minimum representative depth values. If the maximum and minimum representative depth values of depth block data are 200 and 50, representatively, a depth section may be divided into 15 depth sections, wherein 1 section is 10. As described in the above exemplary embodiment, this is only an exemplary embodiment, and thus the depth section may be divided into the larger number of depth sections than 15 depth sections.

If the depth section is determined, the controller 140 may determine a volume matching with the depth section (that is, the controller 140 may determine a volume to corresponding to a depth section or a depth value). In detail, the photographing apparatus 100 may match the depth section with the volume (that is, the photographing apparatus 100 may assign a volume to a corresponding depth section or a depth value) and then store the depth section and the volume. Here, the depth section and the volume may be matched with each other and stored so that the volume increases with an increase in the depth section. In other words, the depth section and the volume may be matched with each other so that if AF is performed with respect to a subject in a close place, a guide audio having a low volume is output, and if AF is performed with respect to a subject in a distant place, a guide audio having a high volume is output The depth section and the volume may be matched with each other on a one-to-one basis. For example, if volumes are respectively matched with a plurality of depth sections, and a depth section of the sixth subject area 760 is a fourth depth section, the controller 140 may match a volume of the sixth subject area 760 as a fourth volume.

Figure 8:
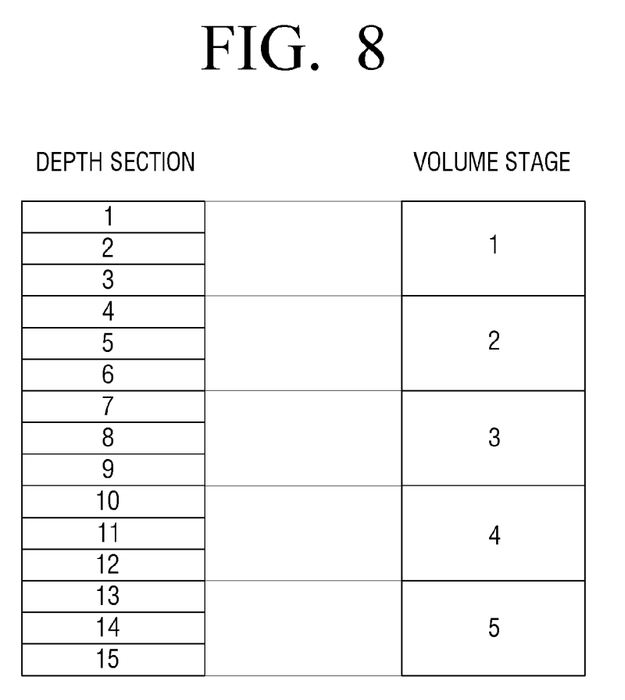
FIG. 8 is a view illustrating a relation between a depth section and a volume according to an exemplary embodiment of the present general inventive concept.

However, this is only an exemplary embodiment, and different volumes may be matched with the preset number of depth sections of a plurality of depth sections. For example, as shown in FIG. 8, first through third depth sections correspond to or are assigned to a first volume. Fourth through sixth depth sections correspond to or are assigned to a second volume. Seventh through ninth depth sections correspond to or are assigned to a third volume. Tenth through twelfth depth sections correspond to or are assigned to a fourth volume. If thirteenth through fifteenth depths correspond to or are assigned to a fifth volume, and the depth section of the sixth subject area 760 is the fourth depth section, the controller 140 may determine the volume of the sixth subject area 760 as a second volume.

If the volume is determined, the controller 140 may control the audio output part 130 to output a guide audio having the determined volume. For example, if AF is performed with respect to the sixth subject area 760, the controller 140 may control the audio output part 130 to output a guide audio having a second volume by using the sixth subject area 760.

In particular, if the area in which AF has been performed is changed, the controller 140 may calculate depth information of the changed area to determine a volume and output a guide audio having the determined volume. Therefore, a user may change the area in which the AF has been performed in self-photographing to capture an image including a plurality of persons to determine whether a focus is adjusted on which one of the plurality of persons, through the volume of the output guide audio.

If the photographing apparatus 100 enters a timer photographing mode, the controller 140 may control the audio output part 130 to output the guide audio according to the calculated depth information. In other words, in the timer photographing mode which is to perform capturing without checking a viewfinder, the user may check whether a focus is adjusted in which area and approximately check a distance between the photographing apparatus 100 and a subject, through the volume of the guide audio.

Figure 9:
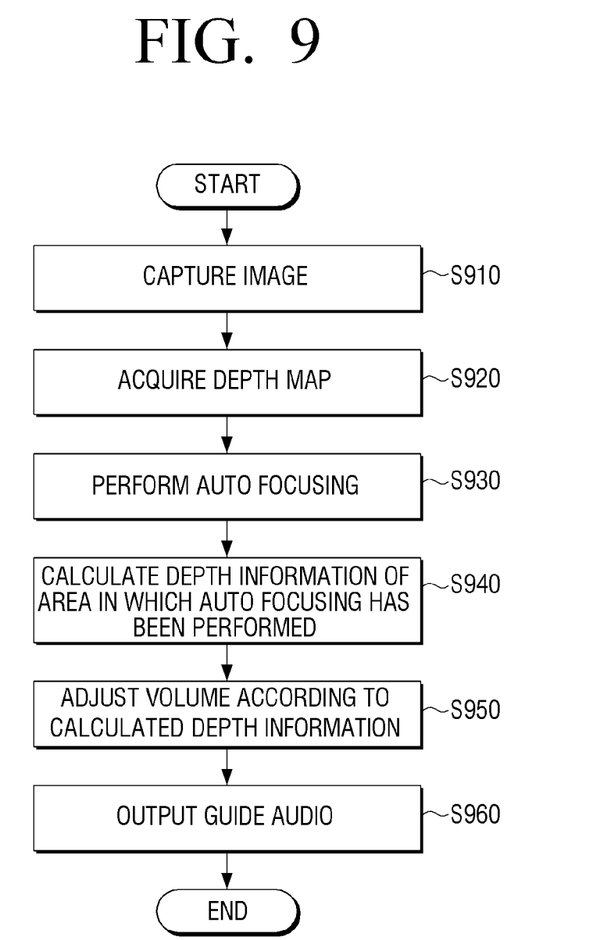
FIG. 9 is a flowchart illustrating a photographing method according to an exemplary embodiment of the present general inventive concept.

A photographing method of the photographing apparatus 100 will now be described in more detail with reference to FIG. 9.

Figure 3:
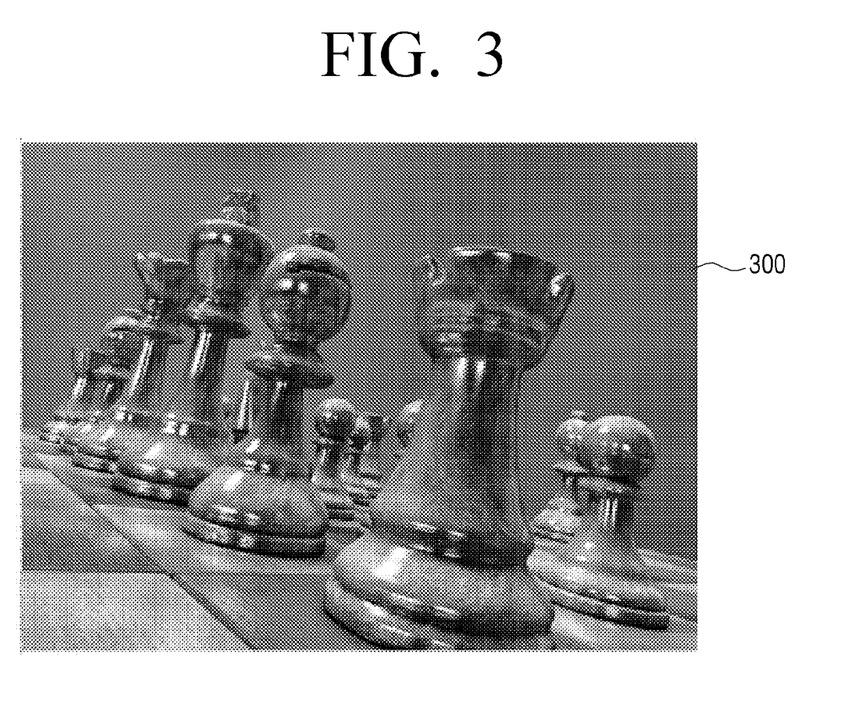
FIG. 3 is a view illustrating an image which is being currently captured by a user according to an exemplary embodiment of the present general inventive concept.

In operation S910, the photographing apparatus 100 captures an image. For example, the photographing apparatus 100 may capture the image 300 as shown in FIG. 3.

In operation S920, the photographing apparatus 100 acquires a depth map of the captured image. For example, the photographing apparatus 100 may acquire a depth map 500 of FIG. 5 as the depth map of the image 300 illustrated in FIG. 3. Here, if the photographing apparatus 100 is a stereo camera, the photographing apparatus 100 may analyze an image input through a plurality of lenses to acquire the depth map and may acquire the depth map through a depth sensor.

In operation S930, the photographing apparatus 100 performs AF. Here, if the photographing apparatus matches the block data 400 of FIG. 4 with the depth map 500 of FIG. 5 to generate the depth block data 600 of FIG. 6, the photographing apparatus 100 may perform AF with respect to at least one of a plurality of areas of the depth block data 600.

In operation S940, the photographing apparatus 100 calculates depth information of the area in which the AF has been performed. In detail, the photographing apparatus 100 may calculate a representative depth value of the area of the depth block data 600 in which the AF has been performed. Here, the representative depth value may be one of an average value of a depth value, a most probable value of the depth value, and an median value of the depth value. The photographing apparatus 100 may determine a depth section including the representative depth value.

In operation S950, the photographing apparatus 100 adjusts a volume according to calculated depth information. In detail, the photographing apparatus 100 may adjust the volume, so that the volume corresponds to the depth section calculated from the area in which the AF has been performed. Here, the depth section and the volume may be matched with each other on a one-to-one basis, but this is only an exemplary embodiment. However, as shown in FIG. 8, different volumes may be matched with the preset number of depth sections of a plurality of depth sections.

In operation S960, the photographing apparatus 100 outputs a guide audio having the adjusted volume.

According to the photographing method as described above, a user may perform AF with respect to a desired area without checking a viewfinder. Also, in timer photographing, a guide audio having a volume, which increases as the user becomes far away from the photographing apparatus 100, may be provided. Therefore, even if the user is far away from the photographing apparatus 100, the user may checks the guide audio.

It is possible that depth values can be calculated through sub-image blocks of an image photographed by the photographing apparatus by performing auto focusing on each sub-image blocks. When the photographing apparatus performs an auto photographing operation on one of the sub-image blocks which may be an area (sub-image block) as described above, it is possible that the controller may determine an amount of an indication corresponding to the depth value of the area or the depth section corresponding to the depth value of the area according to the calculated depth values or sections, and then generate the signal of the indication to correspond to the determined amount.

The present general inventive concept can also be embodied as computer-readable codes as a program on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, a blue-ray disk, a universal serial bus (USB), and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing method of a photographing apparatus, comprising:
   acquiring a depth map of an image currently captured by the photographing apparatus; and
   when auto focusing (AF) of the photographing apparatus is performed,
      calculating depth information of an area in which the AF has been performed;
      calculating a representative depth value of the area in which the AF has been performed; and
      outputting a guide audio having a volume adjusted according to the calculated representative depth value of the area in which the AF has been performed,
   wherein the calculation of the depth information further comprises:
      determining a plurality of depth sections using the representative depth value,
      wherein different volumes are assigned to a preset number of depth sections of the plurality of depth sections.

2. The photographing method of claim 1, further comprising:
   comparing the acquired depth map with block data of the captured image divided into a plurality of areas to generate depth block data.

3. The photographing method of claim 2, wherein the calculation of the depth information comprises:
   performing the AF with respect to at least one of the plurality of areas constituting the depth block data; and
   calculating the representative depth value of the area in which the AF has been performed.

4. The photographing method of claim 3, wherein the output of the guide audio comprises:
   determining a depth section of a plurality of depth sections corresponding to the representative depth value;
   determining a volume matching with the depth section; and
   outputting the guide audio having the determined volume.

5. The photographing method of claim 3, wherein the output of the guide audio comprises:
   calculating representative depth values of the plurality of areas of the depth block data to determine maximum and minimum representative depth values of the captured image;
   setting the plurality of depth sections by using the maximum and minimum representative depth values;
   determining the depth section of the plurality of depth sections comprising the representative depth value of the area in which the AF has been performed;
   determining the volume matching with the depth section; and
   outputting the guide audio having the determined volume.

6. The photographing method of claim 1, further comprising:
when the area in which the AF has been performed is changed, outputting the guide audio having the volume adjusted according to depth information of the changed area.

7. The photographing method of claim 1, wherein if the photographing apparatus enters a timer photographing mode, the guide audio is output according to the calculated depth information.

8. The photographing method of claim 1, wherein the depth map is acquired through a plurality of lens of the photographing apparatus or a depth sensor of the photographing apparatus.

9. A non-transitory computer readable medium to contain computer readable medium as a program to execute the method of claim 1.

10. A photographing apparatus comprising:
a photographing part;
a depth map acquirer to acquire a depth map of an image currently captured by the photographing part;
a controller to:
calculate depth information of an area in which auto focusing (AF) has been performed,
calculate a representative depth value of the area in which the AF has been performed,
determine a plurality of depth sections using the representative depth value, and
determine a volume of a guide audio according to the calculated representative depth value of the area in which the AF has been performed; and
an output part to output the guide audio having the determined volume,
wherein different volumes are assigned to a preset number of depth sections of the plurality of depth sections.

11. The photographing apparatus of claim 10, wherein the controller compares the acquired depth map with block data of the captured image divided into a plurality of areas to generate depth block data.

12. The photographing apparatus of claim 11, wherein when AF is performed with respect to at least one of the plurality of areas constituting the depth block data, the controller calculates the representative depth value of the area in which the AF has been performed.

13. The photographing apparatus of claim 12, wherein the controller determines a depth section of a plurality of depth sections comprising the representative depth value to determine a volume matching with the depth section.

14. The photographing apparatus of claim 12, wherein the controller calculates representative depth values of the plurality of areas of the depth block data to determine maximum and minimum representative depth values of the captured image, sets the plurality of depth sections by using the maximum and minimum representative depth values, determines the depth section of the plurality of depth sections including the representative depth value of the area in which the AF has been performed, and determines the volume matching with the depth section.

15. The photographing apparatus of claim 10, wherein, when the area in which the AF has been performed is changed, the controller calculates depth information of the changed area to determine the volume.

16. The photographing apparatus of claim 10, wherein when the photographing apparatus enters a timer photographing mode, the controller outputs the guide audio according to the calculated depth information.

17. The photographing apparatus of claim 10, wherein the depth map acquirer acquires the depth map through a plurality of lens of the photographing apparatus or a depth sensor of the photographing apparatus.

18. A photographing apparatus comprising:
a photographing part;
a depth map acquirer to acquire a depth map of an image currently captured by the photographing part; and
a controller to:
calculate a representative depth value of an area in which auto focusing (AF) has been performed,
determine a plurality of depth sections using the representative depth value, and
determine a volume of a guide audio according to the calculated representative depth value of the area in which the AF has been performed; and
an output part to output the guide audio having the determined volume,
wherein different volumes are assigned to a preset number of depth sections of the plurality of depth sections.

* * * * *